United States Patent
Lee

(10) Patent No.: US 9,374,680 B2
(45) Date of Patent: Jun. 21, 2016

(54) METHOD FOR DECIDING POSITION OF TERMINAL CONNECTING BLUETOOTH INSIDE VEHICLE

(71) Applicant: HYUNDAI MOTOR COMPANY, Seoul (KR)

(72) Inventor: Young Kwan Lee, Gwacheon-Si (KR)

(73) Assignee: Hyundai Motor Company, Seoul (KR)

( * ) Notice: Subject to any disclaimer, the term of this patent is extended or adjusted under 35 U.S.C. 154(b) by 54 days.

(21) Appl. No.: 14/480,171

(22) Filed: Sep. 8, 2014

(65) Prior Publication Data

US 2015/0181392 A1 Jun. 25, 2015

(30) Foreign Application Priority Data

Dec. 24, 2013 (KR) .................. 10-2013-0162432

(51) Int. Cl.
*H04W 4/04* (2009.01)
*H04W 4/00* (2009.01)

(52) U.S. Cl.
CPC .............. *H04W 4/046* (2013.01); *H04W 4/008* (2013.01)

(58) Field of Classification Search
CPC ..... H04W 4/0046; H04W 4/008; H04W 4/02; H04W 4/04
USPC ........... 455/456.1, 456.2, 456.3, 456.5, 456.6
See application file for complete search history.

(56) References Cited

U.S. PATENT DOCUMENTS

| 7,979,079 B2* | 7/2011 | Dishongh | G01S 1/68 455/456.1 |
| 9,026,099 B2* | 5/2015 | Chhabra et al. | 455/418 |
| 2005/0143141 A1* | 6/2005 | Ochi et al. | 455/569.2 |
| 2008/0146151 A1* | 6/2008 | Lyu et al. | 455/41.2 |
| 2009/0088087 A1* | 4/2009 | Dishongh | G01S 5/0252 455/90.1 |
| 2010/0076622 A1* | 3/2010 | Dickerhoof | B60R 25/24 701/2 |
| 2011/0028161 A1* | 2/2011 | Larsen | G01S 5/0226 455/456.1 |
| 2012/0115464 A1 | 5/2012 | Jang | |
| 2012/0244877 A1* | 9/2012 | Margalef | G01S 5/0252 455/456.1 |
| 2013/0053061 A1 | 2/2013 | Kang et al. | |
| 2013/0257604 A1* | 10/2013 | Mirle et al. | 340/425.5 |
| 2014/0045531 A1* | 2/2014 | Kessoku | H04W 4/046 455/456.2 |
| 2014/0248898 A1* | 9/2014 | O'Brien | H04W 4/046 455/456.1 |
| 2014/0248905 A1* | 9/2014 | Koo | 455/456.1 |
| 2014/0274020 A1* | 9/2014 | Miller | 455/418 |
| 2016/0033616 A1* | 2/2016 | Sen | H04W 64/00 455/456.5 |

FOREIGN PATENT DOCUMENTS

| KR | 10-2007-0042800 A | 4/2007 |
| KR | 10-2011-0108450 A | 10/2011 |
| KR | 2012-0013495 A | 2/2012 |
| KR | 10-2012-0047450 A | 5/2012 |
| KR | 10-2012-0113053 A | 10/2012 |
| KR | 2013-0022885 A | 3/2013 |
| KR | 2013-0091082 A | 8/2013 |

\* cited by examiner

*Primary Examiner* — Christopher M Brandt
(74) *Attorney, Agent, or Firm* — McDermott Will & Emery LLP

(57) ABSTRACT

A method for deciding a position of a terminal connecting a Bluetooth system inside a vehicle includes measuring, by each of a plurality of Bluetooth antennas equipped inside the vehicle, a strength of received power of the terminal. A distance of the terminal is determined from each of the plurality of Bluetooth antennas based on the measured strength of received power. The position of the terminal equipped inside the vehicle is determined based on the distance.

8 Claims, 3 Drawing Sheets

| x | ① | ② | ③ | ④ | ⑤ | ⑥ | ⑦ | ⑧ | ⑨ | ⑩ |
|---|---|---|---|---|---|---|---|---|---|---|
| P(BT_A1-x) | P+5 | P+5 | P+5 | P-5 | P | P-5 | P | P-5 | P | P |
| P(BT_A2-x) | P-5 | P | P-5 | P+5 | P+5 | P+5 | P-5 | P | P-5 | P |
| P(BT_A3-x) | P+5 | P | P-5 | P+5 | P | P-5 | P+5 | P | P-5 | P-5 |
| P(BT_A4-x) | P-5 | P | P-5 | P-5 | P | P+5 | P-5 | P | P+5 | P-5 |

Fig.2

METHOD FOR DECIDING POSITION OF TERMINAL CONNECTING BLUETOOTH INSIDE VEHICLE

CROSS-REFERENCE TO RELATED APPLICATION

This application is based on and claims priority from Korean Patent Application No. 10-2013-0162432, filed on Dec. 24, 2013 in the Korean Intellectual Property Office, the entire content of which is incorporated herein by reference.

TECHNICAL FIELD

The present inventive concept relates to a method for deciding a position of a terminal connecting Bluetooth inside a vehicle, and more particularly, to a method for deciding a position of a terminal connecting Bluetooth inside a vehicle based on strength of Bluetooth received power.

BACKGROUND

In the related art, in the case of connecting a head unit of a vehicle to a terminal while driving, when past history information on connection to the terminal is not stored in the head unit, a driver searches for the terminal using the head unit and selects the searched terminal to connect between the two equipments, thereby providing Bluetooth communication between the two equipments.

That is, the driver performs a connection procedure of operating a button for connecting the head unit to the terminal to search for the terminal, selecting the searched terminal so as to provide the Bluetooth communication between the searched terminal and the head unit, and the like.

To prevent a driver's attention from being distracted due to the use of a cellular phone while driving, a handsfree call which makes a driver's hand free to concentrate on driving has been recommended.

Therefore, in order for a driver to provide an incoming call or an outgoing call while driving, there is a need to connect the terminal with the head unit so as to provide Bluetooth communication between the two equipments. In this case, the connection method for connecting the terminal to the head unit as described above is very complicated and inconvenient and therefore the driver's attention may be distracted, thereby causing an accident and since the Bluetooth connection wirelessly connects the two equipments to each other, when the terminal connecting Bluetooth is positioned at a place which is out of a driver's view, a lot of time and efforts are required to search for the terminal connecting Bluetooth.

SUMMARY

Accordingly, the present inventive concept has been made to solve the above-mentioned problems occurring in the prior art while advantages achieved by the prior art are maintained intact.

One subject to be achieved by the present inventive concept is to provide a method for deciding a position of a terminal connecting Bluetooth inside a vehicle and informing a user of the position of the terminal when the terminal connecting Bluetooth is present inside the vehicle but is out of a driver's view.

One aspect of the present inventive concept relates to a method for deciding a position of a terminal connecting a Bluetooth system inside a vehicle, including measuring, by each of a plurality of Bluetooth antennas equipped inside the vehicle, a strength of received power of the terminal connecting Bluetooth. A distance of the terminal is determined from each of the plurality of Bluetooth antennas based on the measured strength of received power. The position of the terminal equipped inside the vehicle is determined based on the determined distance.

The number of the plurality of Bluetooth antennas may be two and the plurality of Bluetooth antennas may each be positioned at the front or rear inside the vehicle.

The number of the plurality of Bluetooth antennas may be four and the plurality of Bluetooth antennas may each be positioned at the front, rear, right side, or left side inside the vehicle.

The strength of received power may be measured when the terminal performs at least any one of registration of the terminal and the Bluetooth, and connection, disconnection, and calling therebetween.

The strength of received power may be divided into at least three strengths depending on a large and small relationship with a preset reference received power.

The method may further include informing, after the determining of the position of the terminal, a user in the vehicle of the determined position.

In the informing of the user in the vehicle of the determined position, the determined position may be provided to the user in voice or visually.

When the measured strength of received power does not correspond to the at least three divided strengths, the user of the vehicle may be informed that the position of the terminal is not determined or the terminal is not present inside the vehicle.

The distance from the Bluetooth antenna may be divided into at least three distances depending on the divided strengths of received power.

In the determining of the position of the terminal, the position of the terminal may be determined by referring to a positional table including averages of strength of received power measured by the Bluetooth antennas per positions.

BRIEF DESCRIPTION OF THE DRAWINGS

The above and other objects, features and advantages of the present inventive concept will be more apparent from the following detailed description taken in conjunction with the accompanying drawings, in which like reference characters may refer to the same or similar parts throughout the different views. The drawings are not necessarily to scale, emphasis instead being placed upon illustrating the principles of the embodiments of the inventive concept.

FIG. 2 is a table showing strength of power received by a Bluetooth antenna depending on a position of a terminal, in the method for deciding a position of a terminal connecting Bluetooth inside a vehicle according to an embodiment of the present inventive concept.

DETAILED DESCRIPTION OF THE PREFERRED EMBODIMENTS

Figure 1:
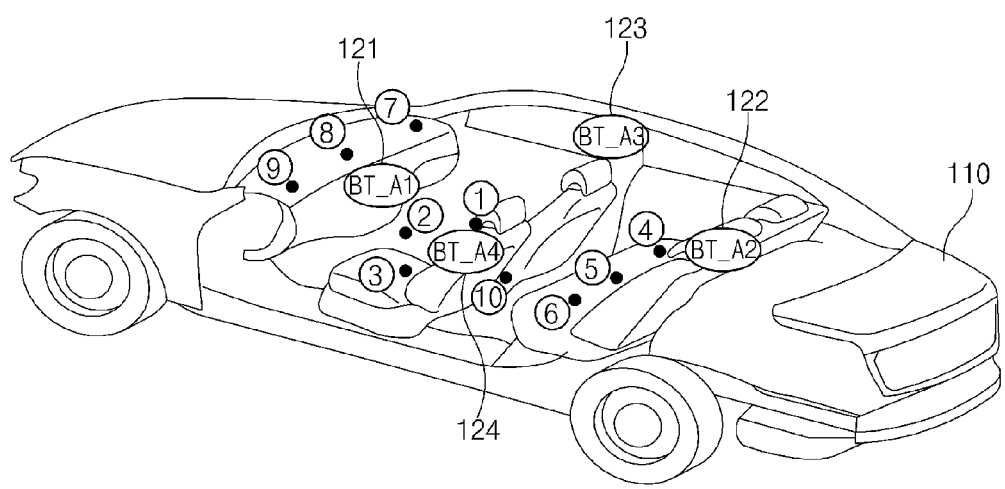
FIG. 1 is a diagram illustrating a space in which a Bluetooth antenna and a terminal may be positioned, in a method for deciding a position of a terminal connecting Bluetooth inside a vehicle according to an embodiment of the present inventive concept.

Advantages and features of the present inventive concept and methods to achieve them will be elucidated from exemplary embodiments described below in detail with reference to the accompanying drawings. Therefore, the present inventive concept is not limited to the exemplary embodiments set forth herein, but may be modified in many different forms. However, these embodiments are provided so that this disclosure will be thorough and complete, and will fully convey the technical spirit of the inventive concept to those skilled in the art.

In the drawings, the embodiments of the present inventive concept are not limited to the illustrated specific form, but in order to clearly understand and/or easily embody the present inventive concept, configurations of the present inventive concept will be enlarged in the accompanying drawings. Herein, specific terms have been used, but are just used for the purpose of describing the present inventive concept and are not used for qualifying the meaning or limiting the scope of the present inventive concept, which is disclosed in the appended claims.

In the present section, terms 'and/or' are used as meaning including at least one of components arranged after and before any component. Further, expression 'connected/coupled' is used as a meaning including a case in which the parts are directly connected with each other and a case in which the parts are indirectly connected with each other with other elements interposed therebetween. Unless explicitly described to the contrary, a singular form includes a plural form in the present specification. In addition, components, steps, operations, and/or elements 'comprise' or 'comprising' mentioned in the present specification do not exclude the existence or addition of one or more other components, steps, operations, and/or elements.

Hereinafter, exemplary embodiments of the present inventive concept will be described in detail with reference to the accompanying drawings.

A Bluetooth system may be implemented to recognize a received power from a terminal connecting Bluetooth. In detail, the received power may be recognized in a unit of −127 to +20 mdB by RSSI Commend of Bluetooth core spec.

Further, the strength of received power of a Bluetooth phone may be increased when the Bluetooth phone performs various operations depending on Bluetooth. For example, when the terminal is registered in the Bluetooth system, when the Bluetooth system is connected to the terminal, when the connection between the Bluetooth system and the terminal is released, or when a user is on the phone through the connected Bluetooth, the strength of received power from the terminal connecting Bluetooth may be increased.

The method for deciding a position of a terminal connecting Bluetooth inside a vehicle according to the embodiment of the present inventive concept may measure the strength of increased and sensed received power by the Bluetooth antenna provided at a specified position inside the vehicle when the above-mentioned several operations are performed between the Bluetooth system and the terminal connecting Bluetooth to decide a position of the terminal inside the vehicle, thereby easily identifying the terminal even though the terminal is out of the user's view.

FIG. 1 is a diagram illustrating a space in which a Bluetooth antenna and a terminal may be positioned, in a method for deciding a position of a terminal connecting Bluetooth inside a vehicle according to an embodiment of the present inventive concept.

Referring to FIG. 1, a vehicle 110 may include a plurality of Bluetooth antennas 121 to 124 and the terminal connecting Bluetooth may be positioned inside the vehicle 110 (at positions ① to ⑩). In FIG. 1, the number of the Bluetooth antennas 121 to 124 is four but the present inventive concept is not limited thereto, and therefore the number of the plurality of antennas is not necessarily limited to four.

When the power is wirelessly transferred from the terminal connecting Bluetooth to the Bluetooth antennas 121 to 124, the power received at the Bluetooth antennas 121 to 124 may be reduced in inverse proportion to a distance. For example, when the terminal connecting Bluetooth is currently at position ②, the strength of power received by a BT_A1 Bluetooth antenna 121 which is positioned in front of the vehicle 110 among the four Bluetooth antennas 121 to 124 may be largest. It may be decided where the terminal connecting Bluetooth is positioned inside the vehicle 110 based on the relationship between the positions of the Bluetooth antennas 121 to 124 and the spaced distance between the terminal connecting Bluetooth. The inside of the vehicle is a slightly narrow space having a spatial limitation, and therefore when the position decided based on the above-mentioned process is provided to the user, the terminal which is out of the user's view may be easily found.

FIG. 2 is a table showing strength of power received by a Bluetooth antenna depending on a position of a terminal, in the method for deciding a position of a terminal connecting Bluetooth inside a vehicle according to an embodiment of the present inventive concept.

Referring to FIG. 2, four Bluetooth antennas BT_A1 to BT_A4 may be provided and the strength of power received by the corresponding Bluetooth antenna may be divided into three values, e.g., P, P+5, and P−5. For example, in FIG. 1, when the terminal connecting Bluetooth is at position ② inside the vehicle 110, in order to decide the position of the corresponding terminal, the Bluetooth system of the vehicle 110 may perform at least any one of a function of registering the Bluetooth terminal in the Bluetooth system of the vehicle, a function of connecting the Bluetooth terminal to the Bluetooth system, a function of releasing the connection between the Bluetooth terminal and the Bluetooth system, and a calling function. The reason is that when the corresponding operation is performed, the received power of Bluetooth may be increased and thus the received power may be easily measured by the Bluetooth antenna equipped inside the vehicle.

Referring to FIGS. 1 and 2, due to the execution of the corresponding operation, for example, the strength of received power measured by the four Bluetooth antennas BT_A1 to BT_A4 may be such that P+5 is measured in the BT_A1 and P is measured in the BT_A2 to BT_A4. That is, the largest strength of received power is measured in the BT_A1 which is the Bluetooth antenna equipped in front of the vehicle, and therefore when the strength of received power is measured, it may be decided that the corresponding terminal is at position ② inside the vehicle 110. The remaining positions ① and ③ to ⑩ may be decided as the position of the corresponding terminal in the same manner as the description of position ② described above, and therefore the detailed description thereof will be omitted.

Figure 3:
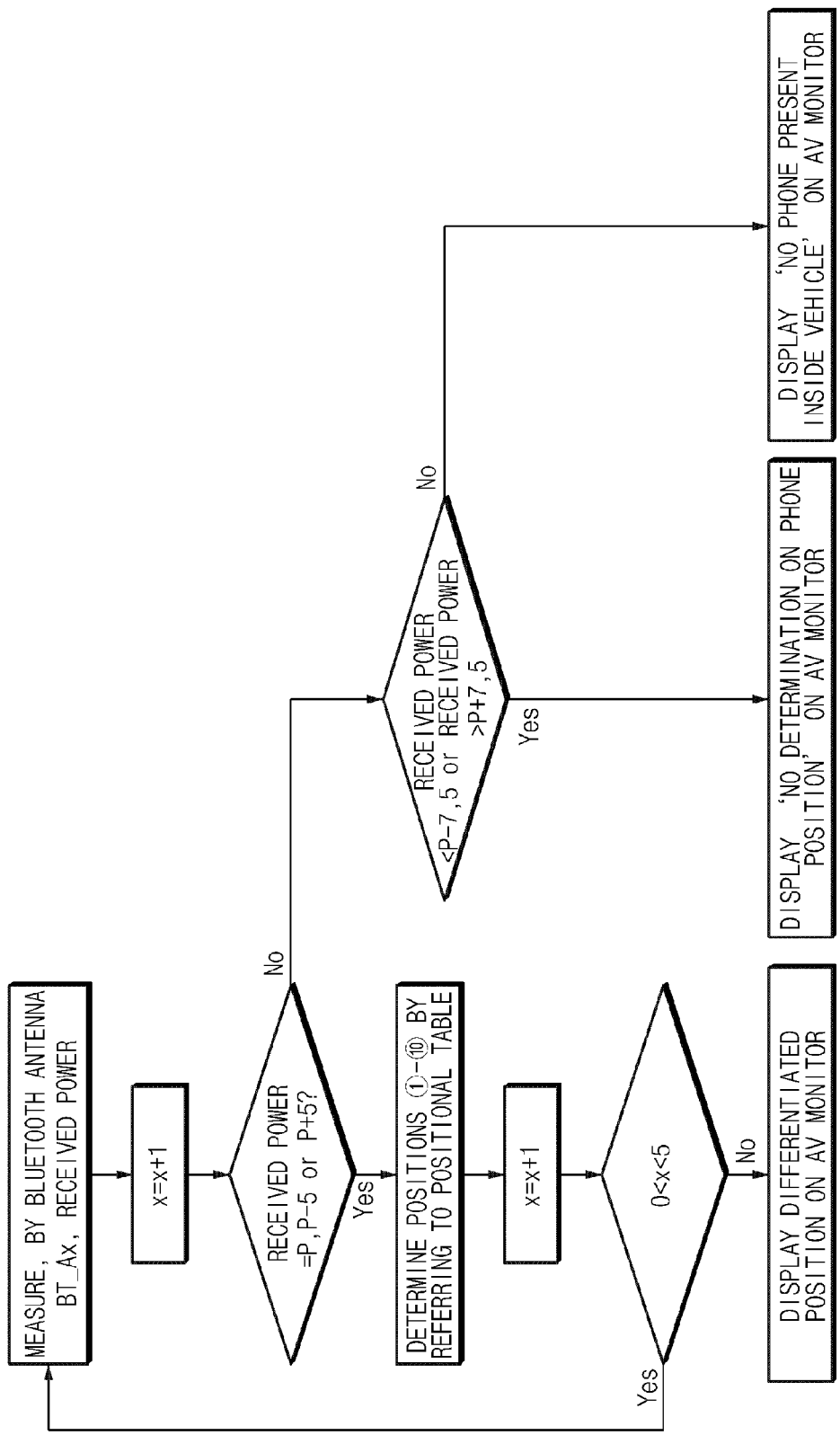
FIG. 3 is a flow chart illustrating the method for deciding a position of a terminal connecting Bluetooth inside a vehicle according to an embodiment of the present inventive concept.

FIG. 3 is a flow chart illustrating the method for deciding a position of a terminal connecting Bluetooth inside a vehicle according to an embodiment of the present inventive concept.

Describing in detail, the method for deciding a position of a terminal connecting Bluetooth inside a vehicle may first allow each of the plurality of Bluetooth antennas equipped inside the vehicle to measure the strength of received power of the terminal connecting Bluetooth. The execution of the registration, connection, disconnection, and calling functions which are described above may be made in a very short period of time and therefore the strength of received power may be measured several times, thereby improving the measurement accuracy thereof.

Next, the spaced distance of the terminal connecting Bluetooth from each of the plurality of Bluetooth antenna may be decided based on the strength of received power which is measured in the aforementioned process. As described above, the spaced distance may be decided based on the inversely proportional relationship between the spaced distance and the strength of received power. Here, the strength of received power may be changed within a predetermined spectrum, but the space inside the vehicle may be limited and therefore the strength of received power measured by a predetermined spectrum may be divided and classified into a predetermined section, e.g., a set of values. For example, the strength of received power may be divided into at least three P, P+5, and P−5 depending on a large and small relationship with the preset reference received power P+5 as illustrated in FIG. 2. By doing so, the spaced distance from the Bluetooth antenna may also be divided into at least three depending on the classified strength of received power.

Next, the position of the terminal which is present inside the vehicle may be decided based on the spaced distance decided in the aforementioned process. For example, the position of the terminal inside the vehicle may be decided by referring to a positional table arranged as illustrated in FIG. 2.

It is possible to improve the reliability of decided results of the position of the terminal by repeatedly performing the process plural times. For example, FIG. 3 illustrates a process of performing the measurement five times or more and then deciding the position of the terminal and informing the user in the vehicle of the decided results. Here, the position of the terminal may be informed to the user in voice or may be visually informed to the user using the head unit or the cluster of the vehicle.

Here, when the measured received power does not correspond to which of at least divided three P, P+5, and P−5 depending on the large and small relationship between the measured received power and the preset reference received power P+5, for example, when the received power is larger than P+7.5 or smaller than P−7.5, the method for deciding a position of a terminal connecting Bluetooth inside the vehicle according to the embodiment of the present inventive concept may inform a user that the position of the terminal may not be decided or that the terminal is not currently present inside the vehicle.

Hereinafter, a process of dividing the strength of received power into at least three P, P+5, and P−5 depending on the large and small relationship with the preset reference received power P+5 as illustrated in FIG. 2 in the foregoing description will be described in more detail.

When the measurement frequency, e.g., the number of measurements, of the strength of received power by the four Bluetooth antennas BT_A1, BT_A2, BT_A3, and BT_A4 is set to be N, the strengths of received power measured N times by the Bluetooth antennas BT_A1 to BT_A4 may be each set to be P(×1N), P(×2N), P(×3N), and P(×4N), errors of the strength of received power measured N times may be each set to be Pα (×1N), Pα (×2N), Pα(×3N), and Pα (×4N), and averages of the accurate strength of received power measured by the Bluetooth antennas BT_A1 to BT_A4 are set to be P(BT_A1-$x$) through P(BT_A4-$x$), P(BT_A1-$x$) through P(BT_A4-$x$), as follows.

$$P(BT\_A1\text{-}x)=\{\Sigma P(\times 1N)+\Sigma P\alpha(\times 1N)\}/N$$

$$P(BT\_A2\text{-}x)=\{\Sigma P(\times 2N)+\Sigma P\alpha(\times 2N)\}/N$$

$$P(BT\_A3\text{-}x)=\{\Sigma P(\times 3N)+\Sigma P\alpha(\times 3N)\}/N$$

$$P(BT\_A4\text{-}x)=\{\Sigma P(\times 4N)+\Sigma P\alpha(\times 4N)\}/N$$

In the above Equations, as the measurement frequency N is increased, the values of ΣPα (×1N), ΣPα (×2N), ΣPα (×3N), and ΣPα (×4N) may become 0 or approximate 0. Therefore, the averages Σ(BT_A1-$x$) to P(BT_A4-$x$) of the accurate strength of received power measured by the Bluetooth antennas BT_A1 to BT_A4 may be as follows.

$$P(BT\_A1\text{-}x)=\{\Sigma P(\times 1N)\}/N$$

$$P(BT\_A2\text{-}x)=\{\Sigma P(\times 2N)\}/N$$

$$P(BT\_A3\text{-}x)=\{\Sigma P(\times 3N)\}/N$$

$$P(BT\_A4\text{-}x)=\{\Sigma P(\times 4N)\}/N$$

The accurate strength of received power measured by the Bluetooth antennas BT_A1 to BT_A4 may be distributed into the predetermined spectrum, but the measured value may be divided into a specific number depending on the following Equation.

$$\text{If } \{P-7.5\}<=\{P(BT\_Ax\text{-}x)\}<\{P+2.5\}, P(BT\_Ax\text{-}x)=P+5$$

$$\text{If } \{P-2.5\}<=\{P(BT\_Ax\text{-}x)\}<\{P+2.5\}, P(BT\_Ax\text{-}x)=P$$

$$\text{If } \{P+2.5\}<=\{P(BT\_Ax\text{-}x)\}<\{P+7.5\}, P(BT\_Ax\text{-}x)=P+5$$

Thereby, the accurate strength of received power measured by the Bluetooth antennas BT_A1 to BT_A4 may be divided into at least three depending on the strength of received power and the spaced distance between the Bluetooth antennas BT_A1 to BT_A4 and the terminal may also be divided into three.

Therefore, the method for deciding a position of a terminal connecting Bluetooth inside a vehicle according to an embodiment of the present inventive concept may measure the strength of increased and sensed received power by the Bluetooth antenna provided at a specified position inside the vehicle when the above-mentioned several operations are performed between the Bluetooth system and the terminal connecting Bluetooth to decide a position of the terminal inside the vehicle, thereby easily identifying the terminal even though the terminal is out of the user's view.

According to embodiments of the present inventive concept, the method for deciding a position of a terminal connecting Bluetooth inside a vehicle may inform the user of the position of the terminal when the terminal connecting Bluetooth is present inside the vehicle but is out of the driver's view.

Hereinabove, although the exemplary embodiments of the present inventive concept have been disclosed for illustrative purposes, those skilled in the art will appreciate that various modifications, additions and substitutions are possible, without departing from the scope and spirit of the inventive concept as disclosed in the accompanying claims Accordingly, the scope of the present inventive concept is not construed as being limited to the described embodiments but is defined by the appended claims as well as equivalents thereto. Considering the above contents, if the modifications and changes of the present inventive concept belong to the range of the following claims and equivalents, the present inventive concept is considered to include the changes and modifications of the present inventive concept.

What is claimed is:

1. A method for deciding a position of a terminal connecting a Bluetooth system inside a vehicle, comprising:

measuring, by each of a plurality of Bluetooth antennas equipped inside the vehicle, a strength of received power of the terminal;

determining a distance of the terminal from each of the plurality of Bluetooth antennas based on the measured strength of received power; and determining the position of the terminal equipped inside the vehicle based on the determined distance, wherein the strength of received power is divided into at least three strengths depending on a large and small relationship with a preset reference received power, and when the measured strength of received power does not correspond to the at least three divided strengths, a user of the vehicle is informed that the position of the terminal is not determined or the terminal is not present inside the vehicle.

2. The method according to claim 1, wherein the number of the plurality of Bluetooth antennas is two and the plurality of Bluetooth antennas are each positioned at the front or rear inside the vehicle.

3. The method according to claim 1, wherein the number of the plurality of Bluetooth antennas is four and the plurality of Bluetooth antennas are each positioned at the front, rear, right side, or left side inside the vehicle.

4. The method of claim 1, wherein the strength of received power is measured when the terminal performs at least any one of registration of the terminal and the Bluetooth system, and connection, disconnection, and calling therebetween.

5. The method according to claim 4, further comprising:
after the step of determining of the position of the terminal, informing the user in the vehicle of the determined position.

6. The method according to claim 5, wherein the informing of the user in the vehicle of the determined position includes providing the determined position the user in voice or visually.

7. The method according to claim 1, wherein the distance from the Bluetooth antenna is divided into at least three distances depending on the divided strengths of received power.

8. The method according to claim 1, wherein the step of determining of the position of the terminal includes determining the position of the terminal by referring to a positional table including averages of strength of received power measured by the Bluetooth antennas per positions.

* * * * *